US008604368B2

(12) United States Patent
Kim et al.

(10) Patent No.: US 8,604,368 B2
(45) Date of Patent: Dec. 10, 2013

(54) CIRCUIT BREAKER HAVING CRADLE WITH A SHUTTER SAFETY DEVICE

(75) Inventors: In Kyum Kim, Cheongju-Si (KR); Seung Pil Yang, Cheongju-Si (KR); Hong Ik Yang, Cheongju-Si (KR); Kil Young Ahn, Daejeon (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 78 days.

(21) Appl. No.: 13/398,756

(22) Filed: Feb. 16, 2012

(65) Prior Publication Data

US 2012/0261239 A1 Oct. 18, 2012

(30) Foreign Application Priority Data

Feb. 24, 2011 (KR) .................. 10-2011-0016730

(51) Int. Cl.
*H01H 9/00* (2006.01)
(52) U.S. Cl.
USPC .................................................. 200/50.22
(58) Field of Classification Search
USPC ............... 200/304, 50.22; 361/617
IPC .......... H02B 13/00,11/24; H01H 71/00, 71/08, H01H 71/12
See application file for complete search history.

(56) References Cited

U.S. PATENT DOCUMENTS

| 3,219,771 | A |   | 11/1965 | Umphrey |   |
|---|---|---|---|---|---|
| 3,610,850 | A | * | 10/1971 | Eichelberger | 200/50.21 |
| 3,614,350 | A | * | 10/1971 | Eichelberger et al. | 200/50.21 |
| 4,183,073 | A | * | 1/1980 | Clausing | 361/617 |
| 4,417,108 | A | * | 11/1983 | Vaill et al. | 200/50.22 |
| 4,424,425 | A | * | 1/1984 | Castonguay | 200/50.22 |
| 4,443,676 | A | * | 4/1984 | Castonguay | 200/304 |
| 5,343,355 | A | * | 8/1994 | Ishikawa | 361/617 |
| 7,067,747 | B2 | * | 6/2006 | Deylitz et al. | 200/50.21 |
| 7,348,505 | B2 | * | 3/2008 | Kashyap et al. | 200/50.22 |
| 7,440,259 | B1 | * | 10/2008 | Deylitz et al. | 361/617 |

FOREIGN PATENT DOCUMENTS

| EP | 0577111 | 1/1994 |
|---|---|---|
| JP | 53-133167 | 10/1978 |
| JP | 54-139241 | 9/1979 |
| JP | 57-175513 | 11/1982 |
| JP | 59-72807 | 5/1984 |

(Continued)

OTHER PUBLICATIONS

Japan Patent Office Application Serial No. 2012-036449, Office Action dated Apr. 16, 2013, 2 pages.

(Continued)

*Primary Examiner* — Vanessa Girardi
(74) *Attorney, Agent, or Firm* — Lee, Hong, Degerman, Kang & Waimey

(57) ABSTRACT

A circuit breaker having a cradle, the circuit breaker comprises: an upper shutter and a lower shutter configured to open and close terminals of the cradle; an upper shutter operation link having one end connected to the upper shutter and another end rotatably coupled to a pivot; a lower shutter operation link having one end connected to the lower shutter and another end rotatably coupled to the pivot; and a shutter safety device comprising a coupling unit fixedly-coupled to the pivot, a rotation unit rotatably coupled to the coupling unit, and a link fixing unit provided at one end of the rotation unit, wherein the link fixing unit is to restrict rotation of the upper shutter operation link and the lower shutter operation link in a contacting manner.

11 Claims, 9 Drawing Sheets

(56) References Cited

FOREIGN PATENT DOCUMENTS

| | | |
|---|---|---|
| JP | 59-89503 | 5/1984 |
| JP | 59-114710 | 8/1984 |
| JP | 1-171512 | 12/1989 |
| JP | 6-22418 | 1/1994 |

OTHER PUBLICATIONS

Japan Patent Office Application No. 2012-036449, Office Action dated Jul. 30, 2013, 3 pages.

* cited by examiner

CIRCUIT BREAKER HAVING CRADLE WITH A SHUTTER SAFETY DEVICE

CROSS-REFERENCE TO RELATED APPLICATION

Pursuant to 35 U.S.C. §119(a), this application claims the benefit of earlier filing date and right of priority to Korean Patent Application No. 10-2011-0016730, filed on Feb. 24, 2011, the contents of which is hereby incorporated by reference in their entirety.

BACKGROUND OF THE INVENTION

1. Field of the Invention

The present invention relates to a circuit breaker having a cradle, and particularly, to a circuit breaker having a cradle equipped with a safety device for preventing inner terminals from being exposed to the outside.

2. Background of the Invention

A circuit breaker serves to interrupt an electric circuit upon detection of an abnormal current which has occurred on the electric circuit. For instance, a vacuum circuit breaker is configured to rapidly interrupt an electric circuit by extinguishing an arc generated when the electric circuit is open or closed and when an abnormal current occurs. This vacuum circuit breaker is installed in a distribution board together with other electric devices for driving of a power plant, a substation, an electric motor, etc.

When a withdrawal-type vacuum circuit breaker is accommodated in a distribution board, a breaker body is firstly accommodate in a cradle thus to be connected to a main circuit of the distribution board. When the breaker body is withdrawn from the cradle, the breaker body connected to the main circuit is disconnected from the main circuit.

The vacuum circuit breaker has a 'driving' position for supplying a voltage and a current as a power source side terminal and a load side terminal of the breaker body are connected to a power source side terminal and a load side terminal of the cradle, and a 'test' position for testing an operation thereof as the power source side terminal and the load side terminal of the breaker body are disconnected from the power source side terminal and the load side terminal of the cradle.

FIG. 1 shows a cradle of a vacuum circuit breaker in accordance with the conventional art. Referring to FIG. 1, the vacuum circuit breaker includes a cradle 1 formed in a hexahedron shape and having an accommodation space 2 for accommodating a breaker body (not shown). The vacuum circuit breaker is provided with a power source side terminal and a load side terminal (not shown) on a rear surface thereof. Under this configuration, the breaker body is inserted into the accommodation space 2 thus to be connected to a main circuit.

The cradle 1 is provided with a shutter for forming a closed space between the terminals of the breaker body and the terminals of the cradle, for stable separation therebetween. This shutter has an upper shutter 3 and a lower shutter 4. Once the circuit breaker is inserted into the cradle for moving to a driving position, the upper shutter 3 and the lower shutter 4 move up and down, respectively. As a result, the shutters form an open space between the terminals of the breaker body and the terminals of the cradle, for connection therebetween.

A shutter opening/closing apparatus 5 for opening and closing the shutter according to movement of the breaker body is provided in the cradle 1. FIG. 2 shows the shutter opening/closing device 5. Referring to FIG. 2, the shutter opening/closing device 5 includes an upper shutter operation link 6a for operating the upper shutter 3 by being connected to the upper shutter 3 and by being rotatably coupled to a pivot 8, and a lower shutter operation link 6b for operating the lower shutter 4 by being connected to the lower shutter 4 and by being rotatably coupled to the pivot 8. The shutter opening/closing device 5 is provided with shutter levers 7a and 7b for driving the upper shutter operation link 6a and the lower shutter operation link 6b by being pressed when the breaker body is inserted into the cradle 1. The upper shutter operation link 6a and the lower shutter operation link 6b are provided with transmission links 9a and 9b connected to the upper shutter 3 and the lower shutter 4, and configured to transmit operations of the upper shutter operation link 6a and the lower shutter operation link 6b to the upper shutter 3 and the lower shutter 4. Under this configuration, the upper shutter 3 and the lower shutter 4 are open and closed.

In the conventional circuit breaker, as the breaker body is inserted into or withdrawn from the cradle, the shutter opening/closing device is driven to open and close the shutter. However, the shutter may be open and closed by a user's arbitrary manipulation. That is, the shutter may be open and closed without any safety device before the breaker body is accommodated in the cradle, or when the breaker body has been separated from the cradle for repair. In this case, if an electric circuit is in a power-on state, an accident may occur.

SUMMARY OF THE INVENTION

Therefore, an aspect of the detailed description is to provide a circuit breaker having a cradle, equipped with a shutter safety device and capable of preventing opening of a shutter even when a user mal-operates a shutter opening/closing device.

To achieve these and other advantages and in accordance with the purpose of this specification, as embodied and broadly described herein, there is provided a circuit breaker having a cradle, the cradle having terminals to which a power source side terminal and a load side terminal of a breaker body are respectively connected, and configured to accommodate the breaker body, the circuit breaker comprising: an upper shutter and a lower shutter configured to open and close terminals of the cradle by up-down moving in opposite directions; an upper shutter operation link having one end connected to the upper shutter and another end rotatably coupled to a pivot, and configured to operate the upper shutter; a lower shutter operation link having one end connected to the lower shutter and another end rotatably coupled to the pivot, and configured to operate the lower shutter; and a shutter safety device including a coupling unit fixedly-coupled to the pivot, a rotation unit rotatably coupled to the coupling unit, and a link fixing unit provided at one end of the rotation unit, wherein the link fixing unit is configured to restrict rotation of the upper shutter operation link and the lower shutter operation link in a contacting manner, and to allow the rotation of the upper and lower shutter operation links as the contact is released by rotation of the rotation unit only when the breaker body is inserted into the cradle.

The circuit breaker having a cradle may further comprise an upper shutter lever protruding from the upper shutter operation link, and configured to rotate the upper shutter operation link; and a lower shutter lever protruding from the lower shutter operation link, and configured to rotate the lower shutter operation link. The upper shutter lever and the lower shutter lever may be configured to rotate the upper shutter operation link and the lower shutter operation link, respectively, by being pressed by the breaker body only when the breaker body is inserted into the cradle.

The circuit breaker having a cradle may further comprise a torsion spring provided at the pivot. When the breaker body is withdrawn from the cradle, the upper shutter operation link and the lower shutter operation link may be rotated by the torsion spring to return to the initial position. The link fixing unit may be configured to restrict rotation of the upper shutter operation link and the lower shutter operation link in a contacting manner, as the rotation unit rotates by a return spring.

In the present disclosure, the upper and lower shutter operation links of a shutter opening/closing device of the cradle may not operate unless the breaker body is inserted into the cradle. This may prevent opening of the shutter by a user's manipulation. Accordingly, the shutter operation links may serve as a safety device of the cradle.

The link fixing unit may include an upper shutter operation link fixing protrusion configured to fix the upper shutter operation link in a contacting manner, and a lower shutter operation link fixing protrusion configured to fix the lower shutter operation link in a contacting manner.

Under the configuration, the upper shutter and the lower shutter may be prevented from operating. This may enhance a safety characteristic of the circuit breaker.

The shutter safety device may further include a return spring having one end contacting the coupling unit, and another end contacting the rotation unit; and a guide pin coupled to one end of the coupling unit, and inserted into the return spring. The guide pin may be configured to form a compression path of the return spring.

Under the configuration, the shutter safety device may be made to return to the original state when the breaker body having been inserted into the cradle is withdrawn from the cradle.

The shutter safety device may further include a contact unit provided at another end of the rotation unit. And, the contact unit may be configured to rotate the rotation unit by contacting a guide of the breaker body when the breaker body is inserted into the cradle.

Under the configuration, the shutter safety device may be made to more smoothly contact the breaker body.

The contact unit may include a first locking hole, and the cradle may include a fixing piece having a second locking hole facing the first locking hole. The shutter safety device may be restricted from rotating by a locking means penetratingly-formed at the first locking hole and the second locking hole.

Since an additional locking means such as a lock is provided, the shutter safety device may be implemented in a double manner.

The circuit breaker having a cradle according to the present disclosure may have the following advantages.

Firstly, the shutter operation links of the shutter opening/closing device of the cradle may not operate unless the breaker body is inserted into the cradle. This may prevent opening of the shutter by a user's manipulation, resulting in enhancing a safety characteristic of the circuit breaker.

Secondly, an additional locking means such as a lock may be provided. This may implement the shutter safety device in a double manner.

The further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
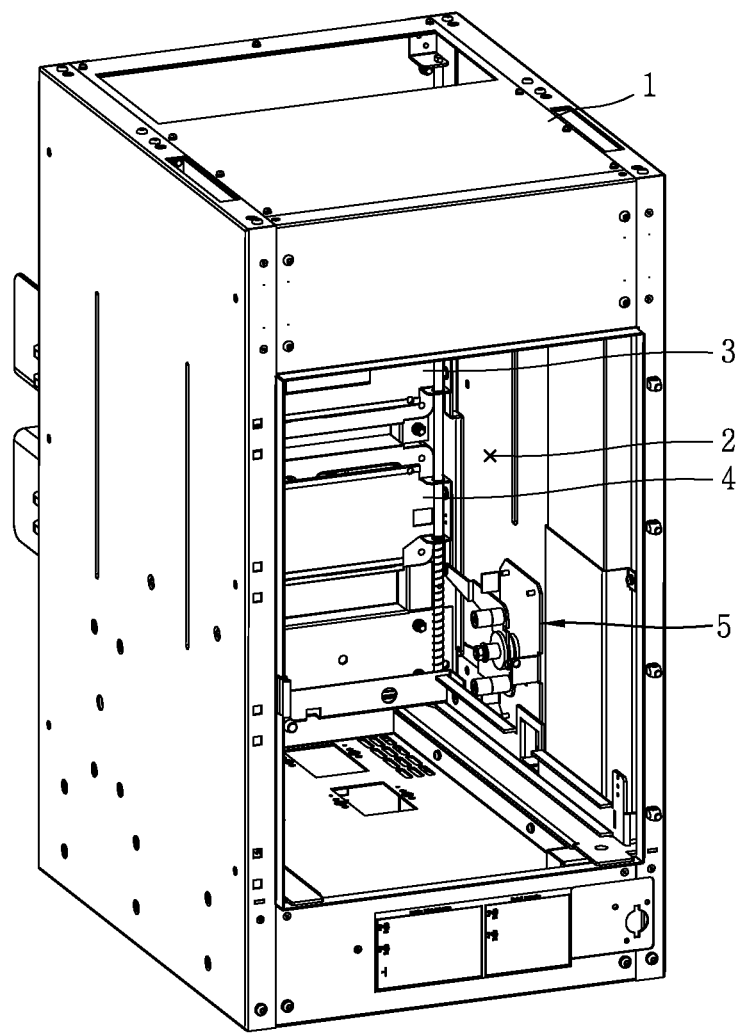
FIGS. 1 and 2 are schematic views of a circuit breaker in accordance with a conventional art.
Figure 2:
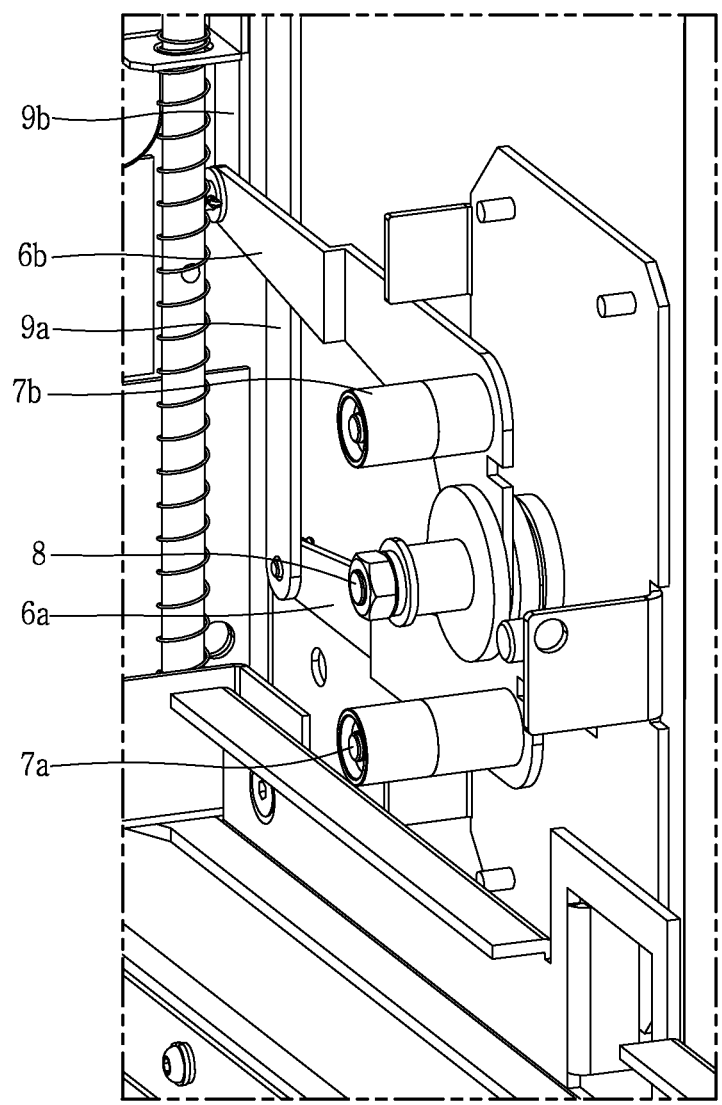
Figure 3:
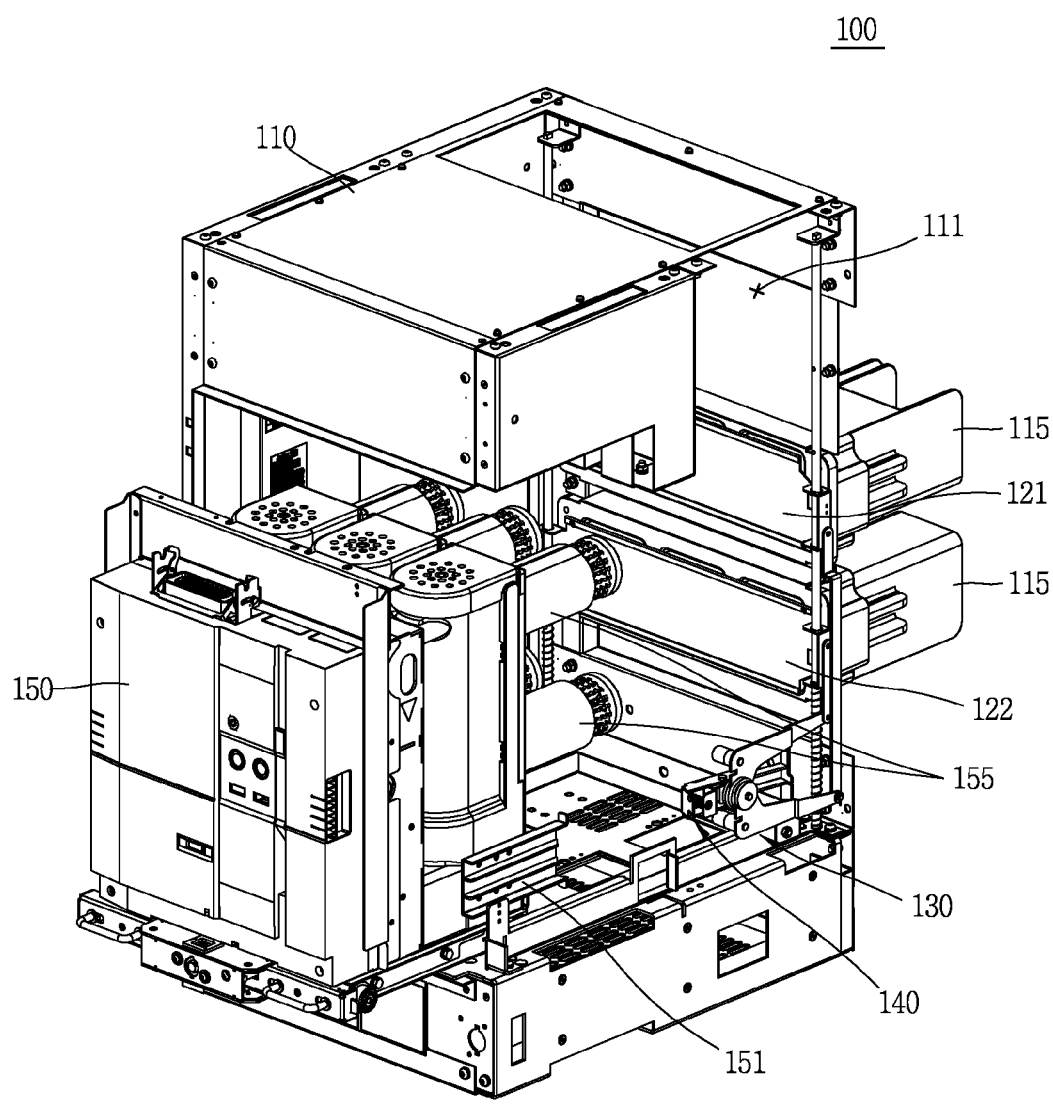
FIG. 3 is a schematic view showing that a breaker body is disposed at a 'test' position according to one embodiment of the present disclosure.
Figure 4:
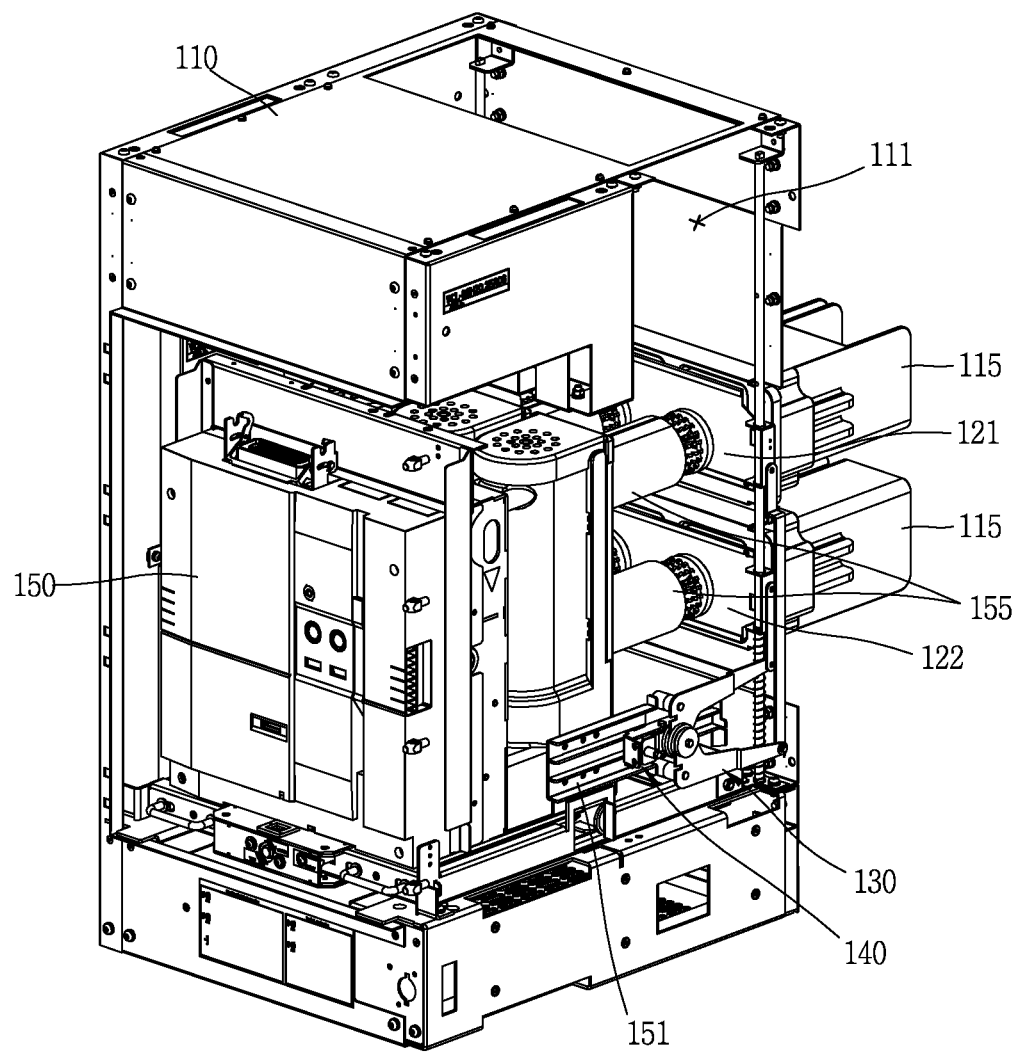
FIG. 4 is a schematic view showing that a breaker body is disposed just before a 'driving' position according to one embodiment of the present disclosure.

FIG. 3 is a schematic view showing that a breaker body is disposed at a 'test' position according to one embodiment of the present disclosure, and FIG. 4 is a schematic view showing that a breaker body is disposed just before a 'driving' position according to one embodiment of the present disclosure.

Referring to FIGS. 3 and 4, a circuit breaker 100 according to one embodiment of the present disclosure includes a cradle 110 having terminals 115 to which a power source side terminal and a load side terminal 155 of a breaker body 150 are connected, respectively, and configured to accommodate therein the breaker body 150.

The cradle 110 is provided with an upper shutter 121 and a lower shutter 122 configured to open and close the terminals 115 of the cradle by up-down moving in opposite directions. The upper shutter 121 and the lower shutter 122 are configured to close space between the terminals 155 of the breaker body 150 and the terminals 115 of the cradle 110 for separation therebetween. As shown in FIG. 4, once the breaker body 150 is inserted into an accommodation space 111 of the cradle 110 to move to a 'driving' position, the upper shutter 121 and the lower shutter 122 move up and down in opposite directions to be open so that the terminals of the breaker body may be connected to the terminals of the cradle.

A shutter opening/closing device 130 for opening and closing the upper shutter 121 and the lower shutter 122 is provided inside the cradle. The shutter opening/closing device 130 includes upper and lower shutter operation links 131 and 132, upper and lower shutter levers 134 and 135, and a pivot 133.

Figure 5:
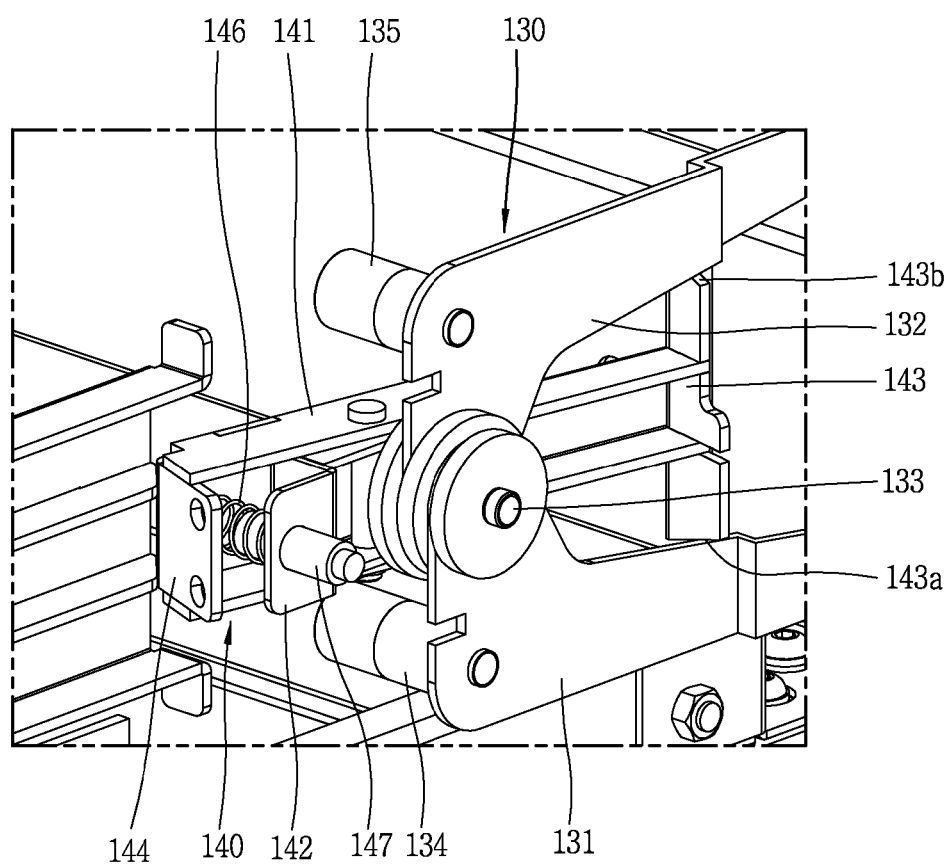
FIG. 5 is a schematic view of a shutter opening/closing device when a circuit breaker is disposed at a 'test' position.

Referring to FIG. 5, the upper shutter operation link 131 has one end connected to the upper shutter 121 and another end rotatably coupled to the pivot 133, and is configured to operate the upper shutter 121. The lower shutter operation link 132 has one end connected to the lower shutter 122 and another end rotatably coupled to the pivot 133, and is configured to operate the lower shutter 122. The shutter operation links and the shutters may be directly connected to each other, or may be connected through an additional connection link mechanism.

Figure 10:
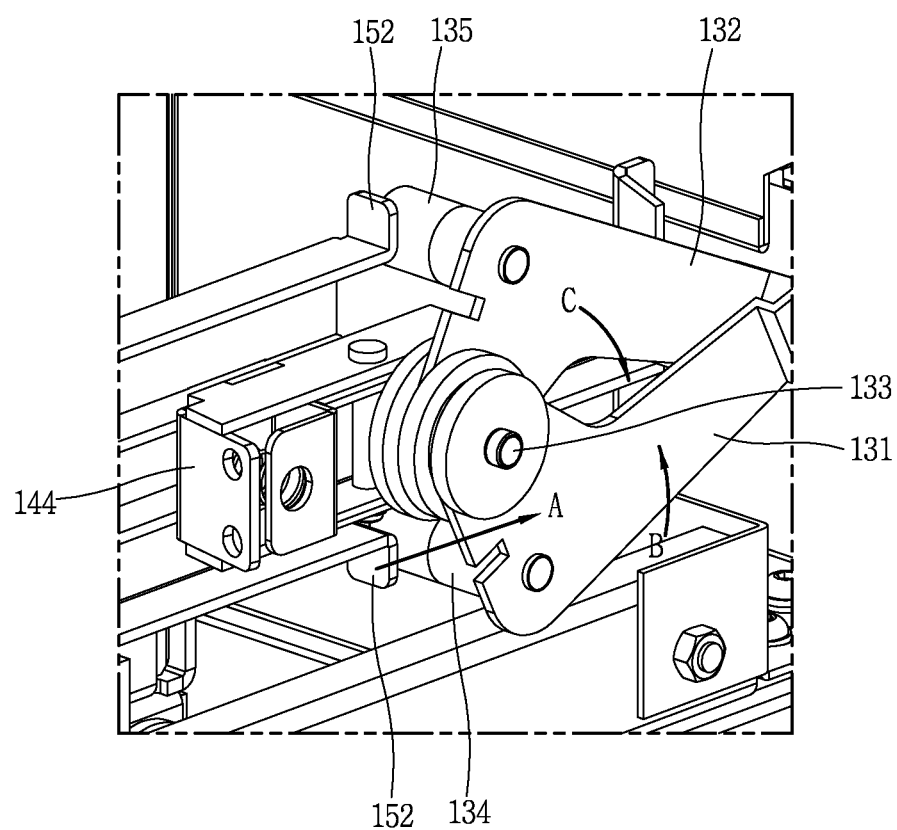
FIG. 10 is a schematic view of a shutter opening/closing device when a breaker body is disposed at a 'driving' position.

Referring to FIG. 5, the upper shutter operation link is disposed below the lower shutter operation link due to the following reason. As shown in FIG. 10, once the shutter lever is pressed as the breaker body is inserted into the cradle (indicated by the direction of 'A'), the shutter operation links rotate in opposite directions centering around the pivot 133. Referring to FIG. 10, the upper shutter operation link rotates in a counterclockwise direction ('B'), and the lower shutter operation link rotates in a clockwise direction ('C'). Accordingly, the upper shutter upward moves and the lower shutter downward moves, thereby opening space between the terminals of the breaker body and the terminals of the cradle for connection between the terminals of the breaker body and the terminals of the cradle.

Figure 9:
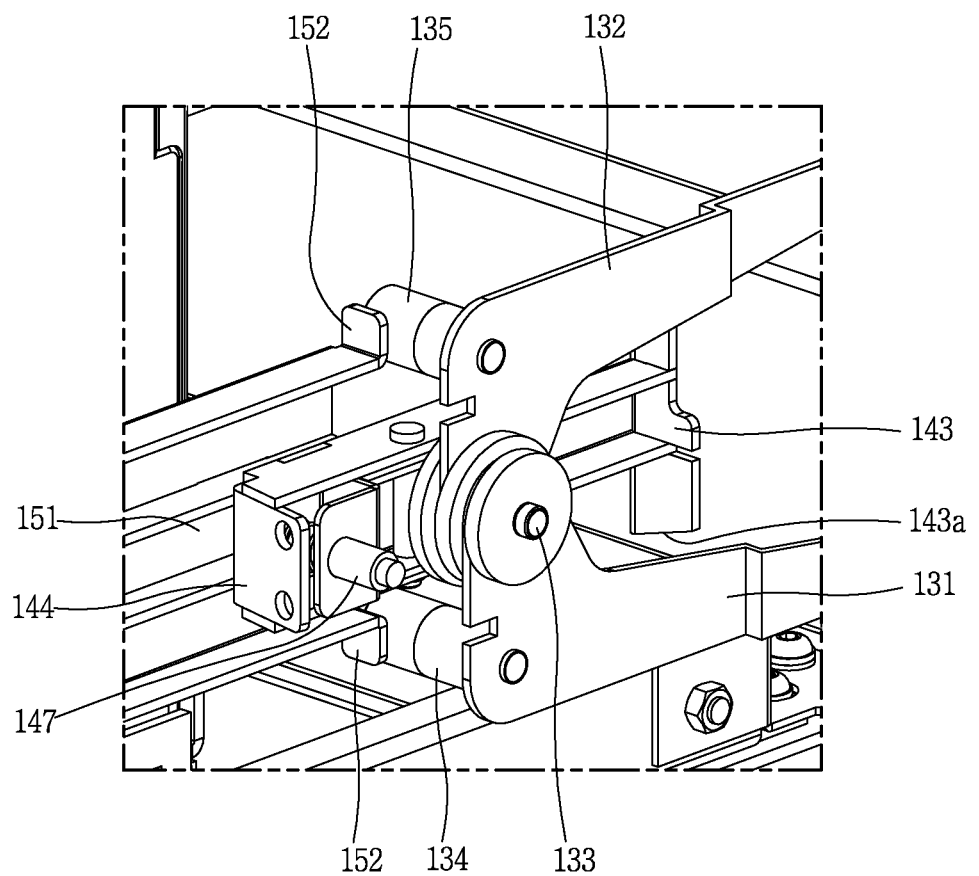
FIG. 9 is a schematic view showing that a shutter opening/closing device has been released from a shutter safety device.

The upper shutter lever 134 is protruding from the upper shutter operation link 131, and is configured to rotate the upper shutter operation link 131. And, the lower shutter lever 135 is protruding from the lower shutter operation link 132, and is configured to rotate the lower shutter operation link 132. FIG. 9 shows a state that a guide 151 provided on the side surface of the breaker body comes in contact with the shutter opening/closing device 130 when the breaker body is inserted into the cradle. Referring to FIG. 9, pressing plates 152 provided at upper and lower parts of the guide 151 press the upper shutter lever 134 and the lower shutter lever 135, respectively in a contacting manner, as the breaker body is inserted into the cradle. Once being pressed, the upper shutter lever 134 and the lower shutter lever 135 move to rotate the upper shutter operation link 131 and the lower shutter operation link 132 centering around the pivot 133.

It should be noted that the upper shutter lever 134 and 135 are pressed by the breaker body only when the breaker body is inserted into the cradle, thereby rotating the upper shutter operation link and the lower shutter operation link.

The pivot 133 may be provided with a torsion spring (not shown). Under this configuration, when the breaker body is withdrawn from the cradle, the upper shutter operation link 131 and the lower shutter operation link 132 may be rotated by the torsion spring thus to return to the initial position.

Referring to FIG. 5, a shutter safety device 140 is mounted to the shutter opening/closing device 130, and is configured to prevent the shutter from being open unless the breaker body is inserted into the cradle.

Figure 6:
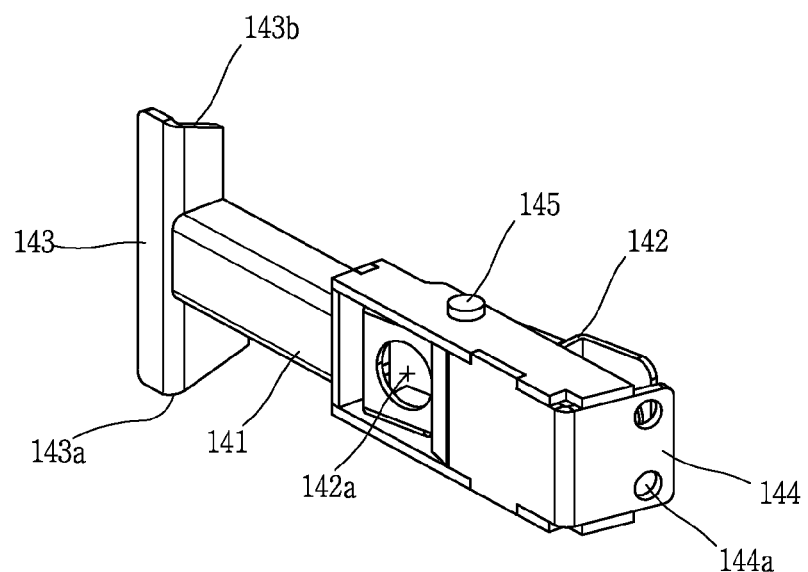
FIGS. 6 and 7 are schematic views of a shutter safety device.
Figure 7:
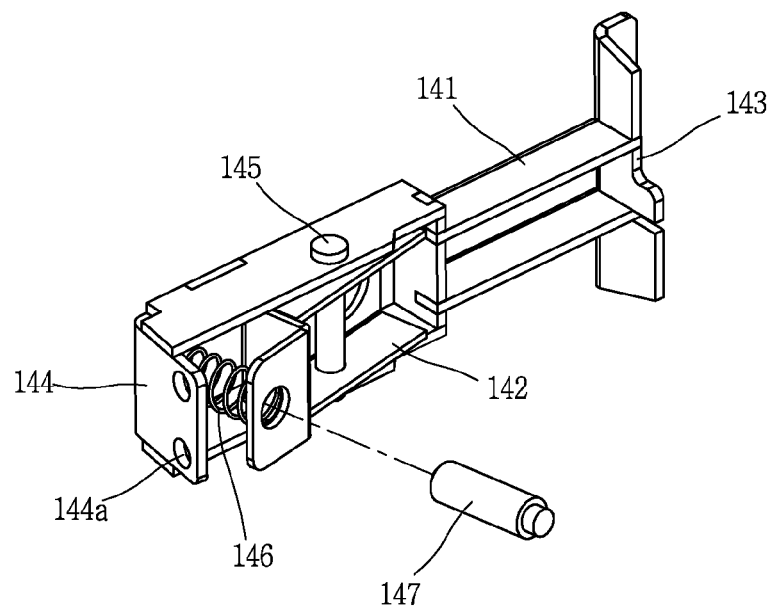

More specifically, referring to FIGS. 6 and 7, the shutter safety device 140 includes a coupling unit 142 fixedly-coupled to the pivot 133, a rotation unit 141 rotatably coupled to the coupling unit 142, and a link fixing unit 143 provided at one end of the rotation unit 141.

The coupling unit 142 is fixed to the shutter opening/closing device. More concretely, the pivot 133 is fixedly-inserted into a coupling hole 142*a* of the coupling unit 142. A rotation shaft 145 centering around the rotation unit 141 rotates is provided at the coupling unit 142. The rotation unit 141 is coupled to the rotation shaft 145, and performs a relative rotation with respect to the shutter opening/closing device. The rotation unit 141 is formed in a bar shape.

The link fixing unit 143 is provided at one end of the rotation unit 141. And, the link fixing unit 143 includes an upper shutter operation link fixing protrusion 143*a* configured to fix the upper shutter operation link in a contacting manner, and a lower shutter operation link fixing protrusion 143*b* configured to fix the lower shutter operation link in a contacting manner.

Figure 8:
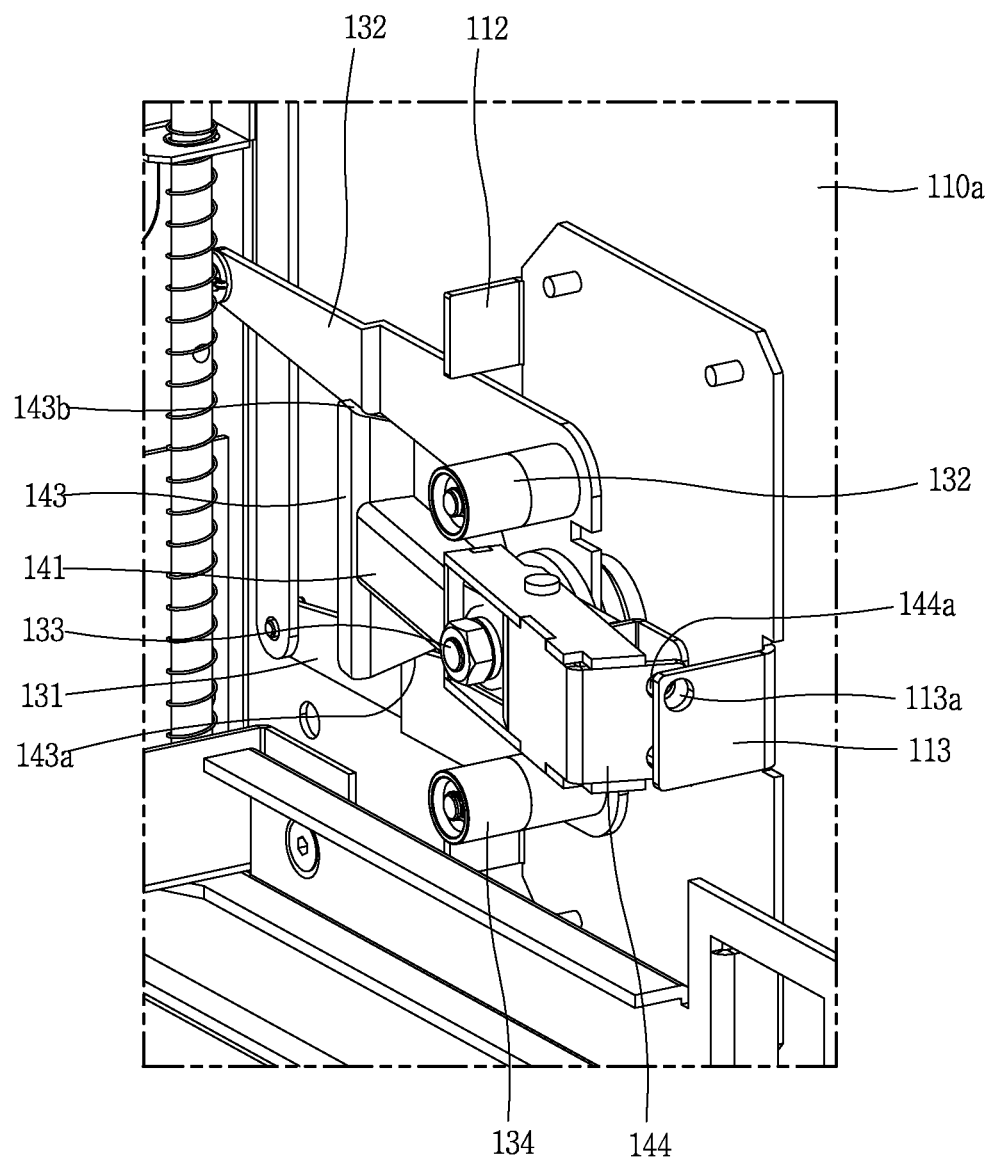
FIG. 8 is a schematic view showing that the shutter safety device of FIGS. 6 and 7 is mounted to a shutter opening/closing device.

Referring to FIGS. 4 and 8, the upper and lower shutter operation link fixing protrusions 143*a* and 143*b* are disposed between the upper shutter operation link 131 and the lower shutter operation link 132. In this case, the breaker body is disposed at a 'test' position. Since the upper and lower shutter operation link fixing protrusions 143*a* and 143*b* are disposed between the upper shutter operation link 131 and the lower shutter operation link 132, the shutter operation links are restricted from operating to prevent opening of the shutter.

Referring to FIGS. 9 and 10, once the breaker body moves to a 'driving' position and the guide of the breaker body is coupled to the shutter opening/closing device, the rotation unit 141 is pressed by the guide 151 thus to be rotated centering around the rotation shaft 145. In this case, the upper and lower shutter operation link fixing protrusions 143*a* and 143*b* rotate to be separated from the space between the upper shutter operation link 131 and the lower shutter operation link 132. Since the upper and lower shutter operation link fixing protrusions 143*a* and 143*b* are separated from the space between the upper shutter operation link 131 and the lower shutter operation link 132, the shutter operation links are operable to allow opening of the shutter.

The link fixing unit 143 restricts rotation of the upper shutter operation link and the lower shutter operation link in a contacting manner, and allows the rotation of the upper and lower shutter operation links as the contact is released by rotation of the rotation unit only when the breaker body is inserted into the cradle. The shutter operation links of the shutter opening/closing device of the cradle are not operated unless the breaker body is inserted into the cradle. This may prevent opening of the shutter by a user's manipulation. Accordingly, the shutter safety device 140 may serve as a safety device of the cradle.

As shown in FIG. 7, the shutter safety device 140 may further include a return spring 146 having one end contacting the coupling unit 142 and another end contacting the rotation unit 141, and a guide pin 147 coupled to one end of the coupling unit 142 and inserted into the return spring 146. The guide pin 147 may be configured to form a compression path of the return spring 146.

Under the configuration, the shutter safety device of the cradle may be made to return to the original state when the breaker body having been inserted into the cradle is withdrawn from the cradle.

The shutter safety device 140 may further include a contact unit 144 provided at another end of the rotation unit 141. And, the contact unit 144 may be configured to rotate the rotation unit 141 by contacting a guide 151 of the breaker body when the breaker body is inserted into the cradle. Under the configuration, the shutter safety device may be made to more smoothly contact the breaker body.

The contact unit 144 may include a first hole 144*a*, and the cradle 110 may include a fixing piece 113 having a second locking hole 113*a* facing the first locking hole 144*a*. This configuration is shown in FIG. 8.

Under this configuration, the shutter safety device may be restricted from rotating by a locking means (not shown) penetratingly-formed at the first locking hole 144*a* and the second locking hole 113a. More concretely, since an additional locking means such as a lock is provided, the shutter safety device may be implemented in a double manner.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A circuit breaker having a cradle, the cradle having terminals to which a power source side terminal and a load side terminal of a breaker body are respectively connected, and configured to accommodate the breaker body, the circuit breaker comprising:
    an upper shutter and a lower shutter configured to open and close terminals of the cradle;
    an upper shutter operation link having one end connected to the upper shutter and another end rotatably coupled to a pivot, and configured to operate the upper shutter;
    a lower shutter operation link having one end connected to the lower shutter and another end rotatably coupled to the pivot, and configured to operate the lower shutter; and
    a shutter safety device comprising a coupling unit fixedly-coupled to the pivot, a rotation unit rotatably coupled to the coupling unit, and a link fixing unit provided at one end of the rotation unit,
    wherein the link fixing unit is configured to restrict rotation of the upper shutter operation link and the lower shutter operation link in a contacting manner, and to allow the rotation of the upper and lower shutter operation links as the contact is released by rotation of the rotation unit when the breaker body is inserted into the cradle.

2. The circuit breaker having a cradle of claim 1, further comprising:
    an upper shutter lever protruding from the upper shutter operation link, and configured to rotate the upper shutter operation link; and
    a lower shutter lever protruding from the lower shutter operation link, and configured to rotate the lower shutter operation link,
    wherein the upper shutter lever and the lower shutter lever are configured to rotate the upper shutter operation link and the lower shutter operation link, respectively, by being pressed by the breaker body when the breaker body is inserted into the cradle.

3. The circuit breaker having a cradle of claim 1, wherein the link fixing unit comprises:
    an upper shutter operation link fixing protrusion configured to fix the upper shutter operation link in a contacting manner; and
    a lower shutter operation link fixing protrusion configured to fix the lower shutter operation link in a contacting manner.

4. The circuit breaker having a cradle of claim 3, further comprising:
    an upper shutter lever protruding from the upper shutter operation link, and configured to rotate the upper shutter operation link; and
    a lower shutter lever protruding from the lower shutter operation link, and configured to rotate the lower shutter operation link,
    wherein the upper shutter lever and the lower shutter lever are configured to rotate the upper shutter operation link and the lower shutter operation link, respectively, by being pressed by the breaker body when the breaker body is inserted into the cradle.

5. The circuit breaker having a cradle of claim 1, wherein the shutter safety device further comprises:
    a return spring having one end contacting the coupling unit, and another end contacting the rotation unit; and
    a guide pin coupled to one end of the coupling unit, and inserted into the return spring,
    wherein the guide pin is configured to form a compression path of the return spring.

6. The circuit breaker having a cradle of claim 5, further comprising:
    an upper shutter lever protruding from the upper shutter operation link, and configured to rotate the upper shutter operation link; and
    a lower shutter lever protruding from the lower shutter operation link, and configured to rotate the lower shutter operation link,
    wherein the upper shutter lever and the lower shutter lever are configured to rotate the upper shutter operation link and the lower shutter operation link, respectively, by being pressed by the breaker body when the breaker body is inserted into the cradle.

7. The circuit breaker having a cradle of claim 5, further comprising a torsion spring provided at the pivot,
    wherein when the breaker body is withdrawn from the cradle, the upper shutter operation link and the lower shutter operation link are rotated by the torsion spring, and
    the link fixing unit restricts rotation of the upper shutter operation link and the lower shutter operation link in a contacting manner as the rotation unit rotates by a return spring.

8. The circuit breaker having a cradle of claim 1, wherein the shutter safety device further comprises a contact unit provided at another end of the rotation unit, and
    wherein the contact unit is configured to rotate the rotation unit by contacting a guide of the breaker body when the breaker body is inserted into the cradle.

9. The circuit breaker having a cradle of claim 8, further comprising:
    an upper shutter lever protruding from the upper shutter operation link, and configured to rotate the upper shutter operation link; and
    a lower shutter lever protruding from the lower shutter operation link, and configured to rotate the lower shutter operation link,
    wherein the upper shutter lever and the lower shutter lever are configured to rotate the upper shutter operation link and the lower shutter operation link, respectively, by being pressed by the breaker body when the breaker body is inserted into the cradle.

10. The circuit breaker having a cradle of claim 8, wherein the contact unit comprises a first locking hole,
- wherein the cradle comprises a fixing piece having a second locking hole facing the first locking hole, and
- wherein the shutter safety device is restricted from rotating by a locking means penetratingly-formed at the first locking hole and the second locking hole.

11. The circuit breaker having a cradle of claim 10, further comprising:
- an upper shutter lever protruding from the upper shutter operation link, and configured to rotate the upper shutter operation link; and
- a lower shutter lever protruding from the lower shutter operation link, and configured to rotate the lower shutter operation link,
- wherein the upper shutter lever and the lower shutter lever are configured to rotate the upper shutter operation link and the lower shutter operation link, respectively, by being pressed by the breaker body when the breaker body is inserted into the cradle.

* * * * *